June 21, 1949.  M. M. COOK  2,473,571
FLUID PRESSURE ACTUATED TIRE MOUNTING
OR DEMOUNTING DEVICE
Filed July 24, 1945  3 Sheets-Sheet 1
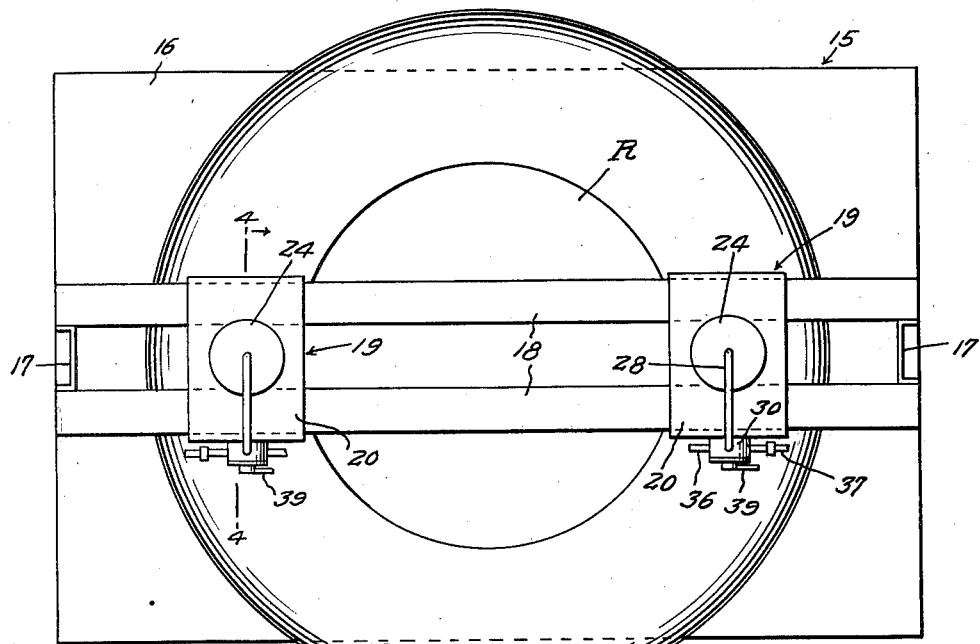
Fig. 1.
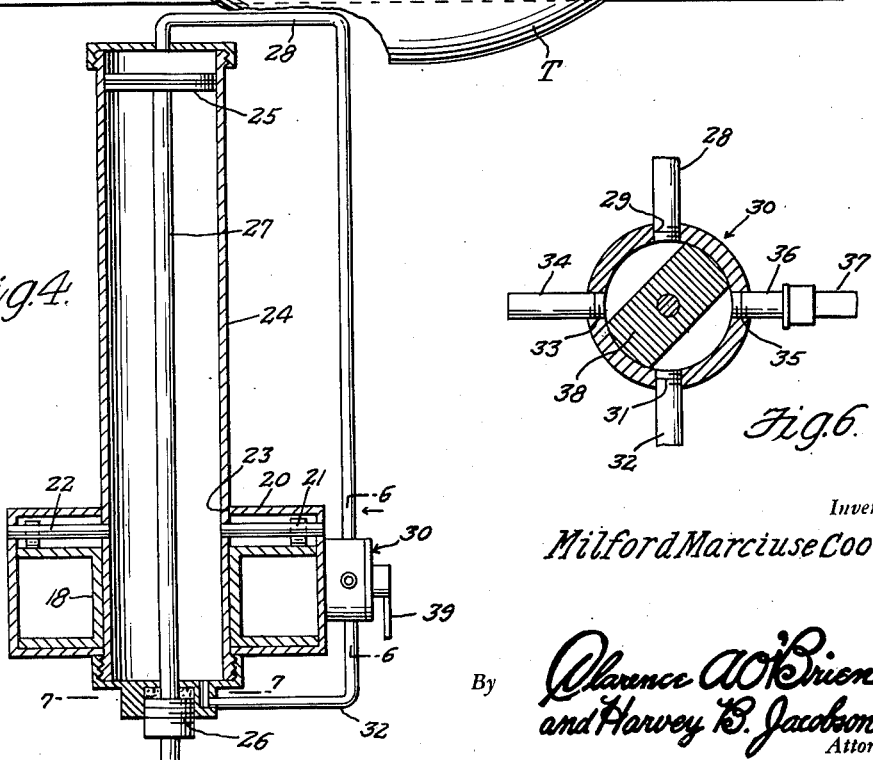
Fig. 4.
Fig. 6.
Inventor
Milford Marciuse Cook
By Clarence A. O'Brien
and Harvey B. Jacobson
Attorneys

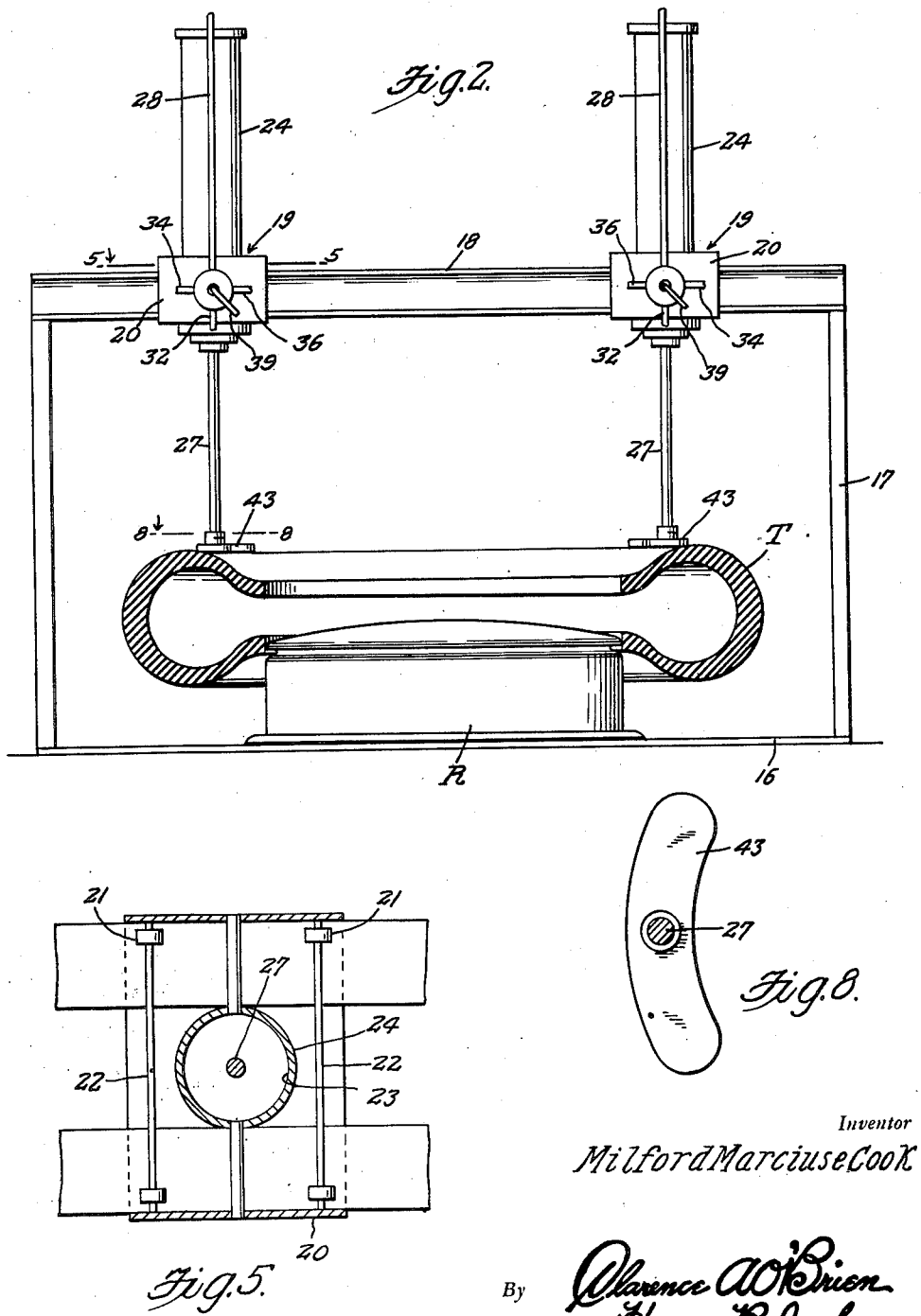

June 21, 1949.　　　　M. M. COOK　　　　2,473,571
FLUID PRESSURE ACTUATED TIRE MOUNTING
OR DEMOUNTING DEVICE
Filed July 24, 1945　　　　　　　　　　3 Sheets-Sheet 3
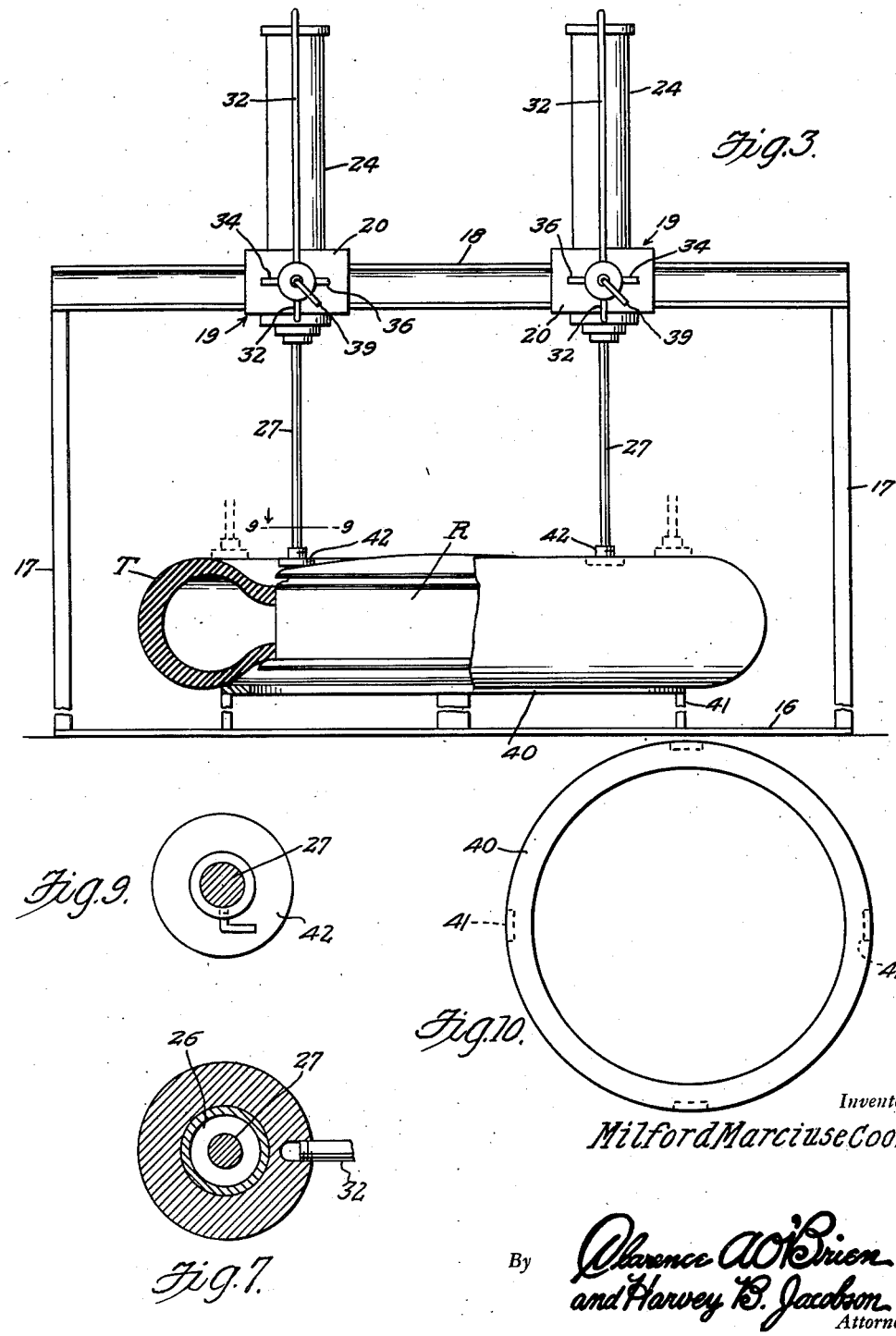
Inventor
Milford Marciuse Cook
By Clarence A. O'Brien
and Harvey B. Jacobson
Attorneys Patented June 21, 1949

2,473,571

UNITED STATES PATENT OFFICE 2,473,571

FLUID PRESSURE ACTUATED TIRE MOUNTING OR DEMOUNTING DEVICE

Milford Marciuse Cook, Visalia, Calif.

Application July 24, 1945, Serial No. 606,734

2 Claims. (Cl. 157—1.2)

This invention relates to a tire-changing appliance, and more particularly to a piece of equipment adapted to assist in mounting and demounting a tire on a rim.

In the handling of heavy duty tires, such as those employed on trucks and busses, much difficulty has been experienced due to the "freezing" of the tire to the rim upon which it is mounted. Such "freezing" is the adhesion of the tire to the rim which frequently takes place due to various physical and chemical reactions betwen the rubber of the tire and the metal of the rim, such as a tendency through the heat generated in the tire for it to vulcanize itself to the rim at its point of contact and also through the rusting of the rim in the vicinity of the tire. Such adhesion of the tire or "freezing" necessitates the hammering and other abusive treatments which are apt to injure the tire carcass, as well as the side walls of the tire with the result that in some instances tires have been rendered practically useless through the abuse required in order to separate the tire from the rim.

The primary object of the present invention is to facilitate the separating of a tire from a rim without causing injury to either the tire or the rim.

Another object of the invention is to facilitate the mounting of a tire on the rim with which it is to be associated.

The above and other objects may be attained by employing this invention which embodies among its features a support upon which an assembled tire and rim may be mounted, a platform upon which the support is adapted to be mounted, standards at opposite sides of the platform, spaced parallel guides adjacent the upper ends of the standards and extending horizontally across the platform in spaced relation thereto, a pair of carriages movable longitudinally of the guides, and means carried by the carriages for exerting pressure on the rim to push it downwardly from its position within the tire. It is possible to use one carriage instead of two if desired.

Other features include pneumatic means carried by the carriages and adapted to be connected to the air pressure supply usually employed in or around a tire-changing station for exerting pressure on the rim or tire, depending on whether the rim is to be removed from the tire or the tire mounted upon the rim.

In the drawings:

Figure 1 is a top plan view of a tire-changing device embodying the features of this invention, Figure 2 is a side view of the device shown in Figure 1, the tire being shown in section and ready to be mounted upon the rim, Figure 3 is a view similar to Figure 2 showing the parts in relation to force the rim from the interior of a tire, Figure 4 is a fragmentary enlarged transverse sectional view taken on the line 4—4 of Figure 1, Figure 5 is a transverse sectional view taken on the line 5—5 of Figure 2, Figure 6 is an enlarged sectional view taken substantially on the line 6—6 of Figure 4, Figure 7 is an enlarged transverse sectional view taken substantially on the line 7—7 of Figure 4, Figure 8 is an enlarged transverse sectional view taken substantially on the line 8—8 of Figure 2, Figure 9 is a transverse sectional view taken substantially on the line 9—9 of Figure 3, and Figure 10 is a plan view of the supporting ring upon which the tire is adapted to be mounted for removal of the rim.

Referring to the drawings in detail, my improved tire-changing apparatus designated generally 15 comprises a base plate or platform 16 having attached to opposite ends thereof a pair of vertical standards 17 to opposite sides of which adjacent their upper ends are attached spaced parallel horizontally extending guide channels 18. Slidably mounted for horizontal movement on the guide channels 18 is a pair of carriages 19 each of which comprises a substantially box-like structure 20 comprising a top plate, depending side walls, and inturned flanges which serve as guides to engage the under sides of the channel members forming the guides 18, while the top plate is supported in spaced relation to the top flanges of the channels 18 by rollers 21 mounted on transversely extending shafts 22 adjacent opposite ends of the carriages 19. (See Fig. 5.) Formed centrally in the top plate of the box-like structure 20 is an opening 23 for the reception of a cylinder 24 in which a piston 25 is slidable. Secured to the piston 25 and extending downwardly through a suitable packing gland 26 in the bottom end of the cylinder 24 is a piston rod 27 to the lower end of which feet to be more fully hereinafter described are adapted to be attached.

Entering the upper end of the cylinder 24 is a pipe 28 which leads to a port 29 of a valve designated generally 30, and leading from a port 31 diametrically opposite the valve 29 is a pipe 32 which is connected to the interior of the lower end of the cylinder 24 through the bottom cylinder head.

Connected to a port 33 arranged intermediate the ports 29 and 31 is an exhaust nipple 34, and diametrically opposite the port 33 is a port 35 to which an air pressure nipple 36 is connected. This nipple 36 may be provided with a fitting 37 for attachment to the air pressure supply usually found as part of the equipment of tire-changing stations (not shown). The valve 30 is provided with a turning plug 38 which is adapted to be manipulated by handle 39 in order to establish communication through the various ports according to the motion to be imparted to the piston rod 27.

A suitable ring-shaped frame 40 supported on legs 41 is adapted to be positioned on the platform 16 when a tire is to be removed from its rim, as will be more fully hereinafter explained, and removably attached to the lower end of each piston rod 27 is a foot 42. The feet 42 are adapted to be removed from the lower end of the piston rod 27 and in lieu thereof I may substitute the feet 43 (Fig. 8) for use when a tire is to be mounted on its rim.

In operation, assuming that a mounted tire is to be removed from its rim, the tire is first placed on the supporting ring 40 which has been put in position on the platform 16 beneath the cylinders 24, it being understood that the piston rods 27 have been retracted to move the feet 42 to the uppermost position. Having placed the tire on the ring 40, the tire-securing ring normally encircling the rim is removed, whereupon the valve or turning plug 38 is moved by means of the handle 39 to establish communication between the air pressure intake nipple 36 and the pipe 28 of each cylinder 24. Such movement of the valve will cause the piston 25 to move downwardly under the influence of the air pressure and simultaneously communication will be established between the port 31 and the port 33 so that any air below the piston 25 will be expelled through the pipe 32, valve 30 and nipple 34 to atmosphere. The downward movement of the piston 25 will cause the piston rod 27 to move downwardly and move the foot 42 into contact with the rim R so as to cause it to be urged downwardly through the tire T which is resting on the ring 40. The simultaneous movement of the piston rods 27 of both cylinders 24 will cause a steady downward pressure on the rim R and thus any seal between the rim and tire will be broken and the parts may be readily separated. Due to the ability of the operator to move the carriages 19 toward or away from one another, it is obvious that the device may be used on rims and tires of varying diameters.

Having removed the tire from the rim, and made necessary repairs, or having substituted a new tire, the ring 40 is removed from the platform 16, and the rim placed on the platform, as illustrated in Figure 2. The next operation is to elevate the piston rod 27 so as to enable the feet 42 to be removed therefrom, whereupon the feet 43 are placed on the piston rod 27, after which the tire T is placed over the rim in position to be mounted thereon. Air pressure is again supplied to the cylinders 24 to urge the pistons downwardly and consequently cause the piston rods 27 to move the feet 43 against the tire, as shown in Figure 2. In this position, it is to be noted that the carriages 19 are moved outwardly or away from one another so as to bring the feet 43 into proper position to exert pressure on the tire T and force it downwardly in proper position about the rim R. Due to the shape of the feet 43, as illustrated in Figure 8, it is obvious that a relative large area of the tire T is engaged so that it may be forced into place without injury or abrasion.

It is possible to use one cylinder 24 if desired, instead of two. The use of one cylinder with its piston rod 27 and foot 42 or foot 43, causes only one foot to engage the tire rather than two.

While in the foregoing there has been shown and described the preferred embodiments of this invention, it is to be understood that various changes in the details of construction, combination and arrangement of parts may be resorted to within the scope of the appended claims without departing from the spirit and scope of the invention as claimed.

I claim:

1. A tire-mounting and removing device which includes a platform, a pair of spaced standards at opposite sides of the platform, a tire and rim assembly support on the platform between the standards, a pair of spaced parallel horizontally disposed guide beams supported by the standards adjacent their upper ends, a pair of carriages movable along the guide beams, a cylinder and piston assembly carried by each carriage, each such latter assembly having its piston rod operable downwardly between the guide beams, and feet on the lower ends of the piston rods adapted to be advanced or retracted with relation to the tire assembly support according to the direction of movement of the pistons.

2. A tire-mounting and removing device which includes a platform, a pair of spaced standards at opposite sides of the platform, a tire and rim assembly support on the platform between the standards, a pair of spaced parallel horizontally disposed guide beams supported by the standards adjacent their upper ends, a pair of carriages movable along the guide beams, a cylinder and piston assembly carried by each carriage, each such latter assembly having its piston rod operable downwardly between the guide beams, feet on the lower ends of the piston rods adapted to be advanced or retracted with relation to the tire assembly support according to the direction of movement of the pistons, and a valve on each carriage for controlling the admission and discharge of fluid under pressure to its respective piston.

MILFORD MARCIUSE COOK.

REFERENCES CITED

The following references are of record in the file of this patent:

UNITED STATES PATENTS

| Number | Name | Date |
|---|---|---|
| 1,124,316 | Pfleumer | Jan. 12, 1915 |
| 1,239,454 | Boyd | Sept. 11, 1917 |
| 1,724,813 | Weaver et al. | Aug. 13, 1929 |
| 1,948,434 | Stafford et al. | Feb. 20, 1934 |
| 2,043,169 | Hawkinson | June 2, 1936 |
| 2,233,371 | Smith | Feb. 25, 1941 |
| 2,281,476 | Casey | Apr. 28, 1942 |
| 2,418,849 | Polt | Apr. 15, 1947 |

FOREIGN PATENTS

| Number | Country | Date |
|---|---|---|
| 720,878 | France | Dec. 12, 1931 |
| 612,890 | Germany | May 7, 1935 |